US012486719B2

(12) United States Patent
Park et al.

(10) Patent No.: US 12,486,719 B2
(45) Date of Patent: *Dec. 2, 2025

(54) SAFETY APPARATUS FOR LADDER

(71) Applicant: IKAMPER CO., LTD., Paju-Si (KR)

(72) Inventors: Soon Gyu Park, Paju-Si (KR); Sung Suk Ha, Andong (KR)

(73) Assignee: IKAMPER CO., LTD., Paju-si (KR)

( * ) Notice: Subject to any disclaimer, the term of this patent is extended or adjusted under 35 U.S.C. 154(b) by 205 days.

This patent is subject to a terminal disclaimer.

(21) Appl. No.: 17/999,584

(22) PCT Filed: Mar. 12, 2021

(86) PCT No.: PCT/KR2021/003104

§ 371 (c)(1),
(2) Date: Nov. 22, 2022

(87) PCT Pub. No.: WO2022/191347

PCT Pub. Date: Sep. 15, 2022

(65) Prior Publication Data

US 2024/0003189 A1 Jan. 4, 2024

(51) Int. Cl.
*E06C 7/18* (2006.01)

(52) U.S. Cl.
CPC .................................... *E06C 7/183* (2013.01)

(58) Field of Classification Search
CPC . E06C 7/183; E06C 7/165; E06C 7/16; E06C 7/08
USPC .......................................................... 182/121
See application file for complete search history.

(56) References Cited

U.S. PATENT DOCUMENTS 1,920,552 A * 8/1933 Dollerhide ................ E06C 7/16 248/238
3,503,468 A * 3/1970 Taylor, Sr. ................ E06C 7/16 182/121
3,899,045 A * 8/1975 Geisel ....................... E06C 7/16 182/121
4,241,807 A * 12/1980 McKenna ................. E06C 7/16 182/121

(Continued)

FOREIGN PATENT DOCUMENTS

KR 20130000294 U 1/2013
KR 20160000702 U 3/2016

(Continued)

OTHER PUBLICATIONS

International Search Report dated Sep. 15, 2022 for PCT International Application No. PCT/KR2021/003104 (3 pages).

*Primary Examiner* — Paola Agudelo
(74) *Attorney, Agent, or Firm* — Maier & Maier, PLLC

(57) ABSTRACT

The present disclosure relates to a safety apparatus for a ladder. Specifically, a safety apparatus for a ladder according to an embodiment of the present disclosure protects safety of a user who uses a ladder, and the safety apparatus includes a guard member provided to be mounted on the ladder and extending in one direction, and a plurality of fixing members connected to the guard member, disposed to be spaced apart from one another in a longitudinal direction of the guard member, and configured to fix the guard member to the ladder, in which the guard member has at least a part configured to protrude toward a rear side of the ladder and cover a rear surface of the ladder.

14 Claims, 9 Drawing Sheets

(56) References Cited

U.S. PATENT DOCUMENTS

| | | | | | |
|---|---|---|---|---|---|
| 4,401,187 | A * | 8/1983 | Van Patten | E06C 7/16 | 248/238 |
| 4,437,544 | A * | 3/1984 | Anderson | E06C 7/165 | 182/120 |
| 4,687,075 | A * | 8/1987 | Skaggs | E06C 7/16 | 248/238 |
| 4,972,923 | A * | 11/1990 | Krause | E06C 7/16 | 248/238 |
| 5,056,620 | A * | 10/1991 | Zumwalt | E06C 7/165 | 182/120 |
| 5,191,954 | A * | 3/1993 | Ledford | E06C 7/16 | 248/210 |
| 5,429,205 | A * | 7/1995 | Collins | E06C 7/16 | 248/238 |
| 6,591,941 | B1 * | 7/2003 | Mannie | E06C 7/14 | 248/210 |
| 6,688,570 | B1 * | 2/2004 | Mundt | E06C 7/14 | 248/238 |
| 9,890,589 | B2 * | 2/2018 | Goodnow | E06C 7/16 | |
| 2004/0069569 | A1 * | 4/2004 | Fraser | E06C 7/16 | 182/129 |
| 2022/0049550 | A1 * | 2/2022 | Park | E06C 7/08 | |

FOREIGN PATENT DOCUMENTS

| | | | |
|---|---|---|---|
| KR | 20160075423 | A | 6/2016 |
| KR | 102228108 | B1 | 3/2021 |
| WO | 2021206268 | A1 | 10/2021 |

* cited by examiner

1'

SAFETY APPARATUS FOR LADDER

BACKGROUND OF THE DISCLOSURE

Field of the Disclosure

The present disclosure relates to a safety apparatus for a ladder.

Description of the Related Art

In general, a ladder refers to an auxiliary movement means that a user uses to move upward to a higher position or move downward to a lower position. The ladder enables the user to easily and quickly move between facilities having various shapes and level differences.

The ladder includes a pair of vertical supports having preset lengths and arranged in parallel with each other at a predetermined interval, and a plurality of horizontal supports fixedly installed at preset intervals between the pair of vertical supports.

However, in the case of the ladder in the related art, during a process in which the user moves to an intended position while repeatedly holding the vertical supports with his/her hands and steps on the horizontal supports, the user frequently loses his/her grasp on the vertical supports or the user's feet slip off the horizontal supports, which causes an accident in which the user falls down. Therefore, various safety apparatuses for a ladder have been proposed to prevent a safety accident that the user may experience while using the ladder.

However, the safety apparatus for a ladder in the related art has a very complicated configuration, which causes problems in that a large amount of time is required to install the safety apparatus for a ladder on the ladder, and it is difficult to store the safety apparatus.

Therefore, there is a need for studies on a safety apparatus for a ladder, which may be conveniently installed on a ladder, easily stored, and prevent a user's safety accident that may occur while the user uses the ladder.

SUMMARY OF THE DISCLOSURE

Accordingly, the present disclosure has been made keeping in mind the above problems occurring in the related art, and the present disclosure is intended to provide a safety apparatus for a ladder that may be conveniently installed on a ladder, easily stored, and prevent a user's safety accident that may occur while the user uses the ladder.

According to one aspect, there is provided a safety apparatus for a ladder, which protects safety of a user who uses a ladder, the safety apparatus including: a guard member provided to be mounted on the ladder and extending in one direction; and at least one fixing member provided on the guard member and configured to fix the guard member to the ladder, in which the guard member has at least a part configured to protrude toward a rear side of the ladder and cover a rear surface of the ladder.

In the safety apparatus for a ladder according to the embodiment of the present disclosure, the fixing member may be provided as a plurality of fixing members, and the plurality of fixing members may be disposed in a width direction of the guard member.

In the safety apparatus for a ladder according to the embodiment of the present disclosure, the guard member may include: a connection part connected to the fixing member; and a cover part provided on at least one end of the connection part and having a rigidity reinforcing panel, and the rigidity reinforcing panel may be disposed on at least a part of the cover part and configured to protrude toward the rear side of the ladder.

In the safety apparatus for a ladder according to the embodiment of the present disclosure, the cover part may have a folding line extending in the other direction perpendicular to one direction, and the rigidity reinforcing panel may be disposed at a lower side of the cover part defined by the folding line.

In the safety apparatus for a ladder according to the embodiment of the present disclosure, the cover part may be configured to be selectively unfolded with respect to the folding line.

In the safety apparatus for a ladder according to the embodiment of the present disclosure, the connection part may be provided as a plurality of connection parts, the cover part may be provided as a plurality of cover parts, and the plurality of the connection parts and the plurality of the cover parts may be alternately disposed.

In the safety apparatus for a ladder according to the embodiment of the present disclosure, the connection part and the cover part may be integrated.

In the safety apparatus for a ladder according to the embodiment of the present disclosure, the cover part may include: a first cover body disposed at any one of one side and the other side of the folding line; and a second cover body disposed at the other of one side and the other side of the folding line and having a length equal to a length of the first cover body.

In the safety apparatus for a ladder according to the embodiment of the present disclosure, the first cover body and the second cover body may have the same shape.

In the safety apparatus for a ladder according to the embodiment of the present disclosure, the fixing member may be provided on one surface of the connection part and surround at least a part of a peripheral surface of a horizontal support of the ladder.

In the safety apparatus for a ladder according to the embodiment of the present disclosure, the fixing member may have a hook shape.

In the safety apparatus for a ladder according to the embodiment of the present disclosure, the fixing member may include a first fixing body provided on one surface of the connection part and configured to surround at least a part of a peripheral surface of a horizontal support of the ladder.

In the safety apparatus for a ladder according to the embodiment of the present disclosure, the fixing member may include a second fixing body provided on one surface of the connection part and configured to surround the remaining part of the peripheral surface of the horizontal support of the ladder and selectively engage with the first fixing body.

The safety apparatus for a ladder according to the embodiment of the present disclosure may further include a reinforcing member provided on at least one end of the guard member and having a hook shape so as to be caught by the ladder.

The safety apparatus for a ladder according to the embodiment of the present disclosure may be conveniently installed on the ladder, easily stored, and prevent the user's safety accident that may occur while the user uses the ladder.

DETAILED DESCRIPTION OF THE DISCLOSURE

Figure 1:
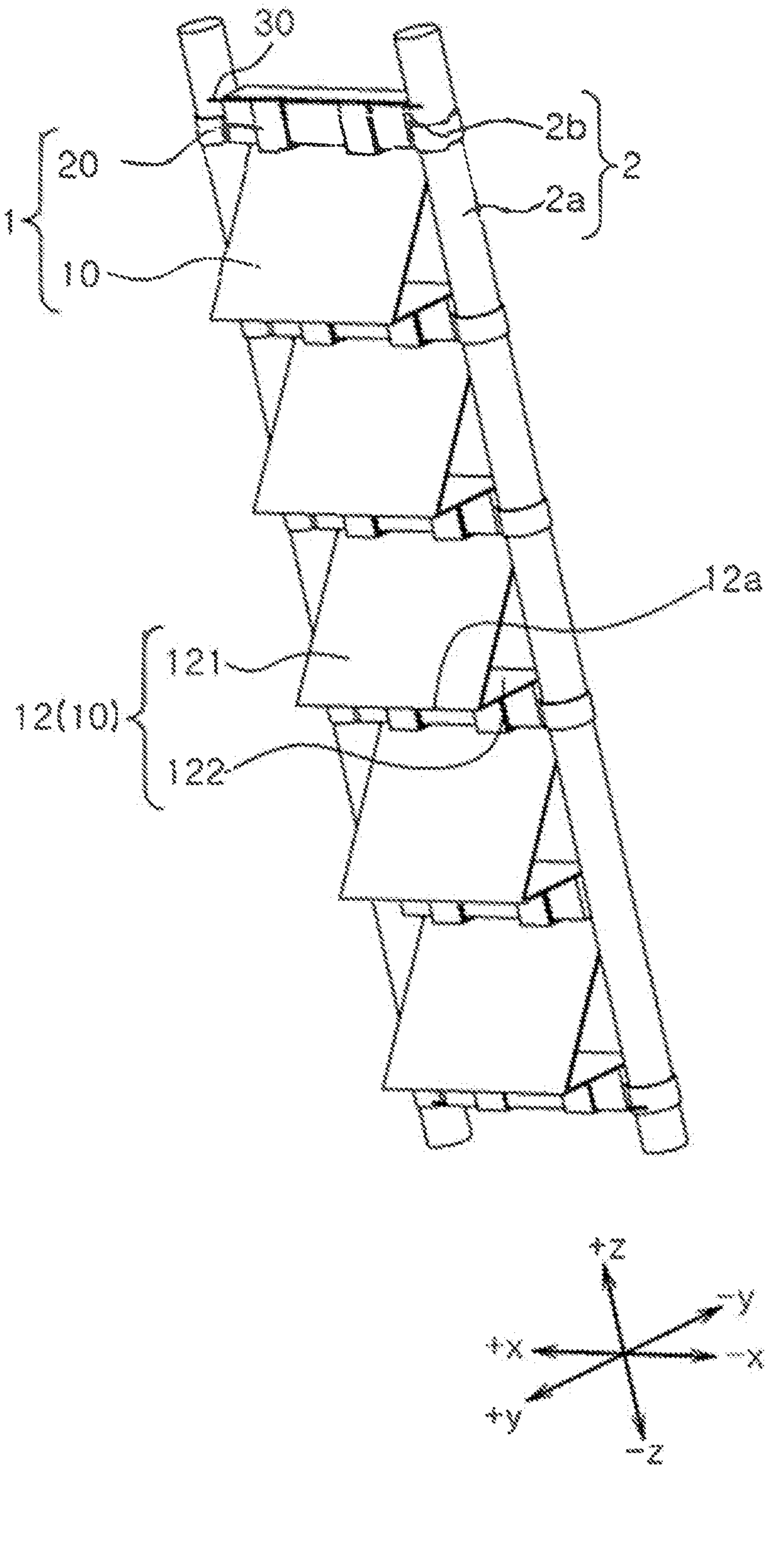
FIG. 1 is a perspective view illustrating a state in which a safety apparatus for a ladder according to the embodiment of the present disclosure is mounted on a ladder.

Hereinafter, specific embodiments for implementing the spirit of the present disclosure will be described in detail with reference to the drawings.

In addition, in the description of the present disclosure, the specific descriptions of publicly known related configurations or functions will be omitted when it is determined that the specific descriptions may obscure the subject matter of the present disclosure.

In addition, when one constituent element is described as being "connected to" another constituent element, it should be understood that one constituent element can be connected directly to another constituent element, and an intervening constituent element can also be present between the constituent elements.

The terms used in the present specification are used only for the purpose of describing particular embodiments and are not intended to limit the present disclosure. Singular expressions include plural expressions unless clearly described as different meanings in the context.

In addition, it is noted in advance that in the present specification, the terms "one side," "the other side," and the like are explained based on the illustration in the drawings and may be differently expressed when the directions of the corresponding objects are changed. For the same reason, some constituent elements in the accompanying drawings are illustrated in an exaggerated or schematic form or are omitted, and a size of each constituent element does not entirely reflect an actual size.

In addition, the terms including ordinal numbers such as "first," "second," and the like may be used to describe various constituent elements, but the constituent elements are not limited by the terms. These terms are used only to distinguish one constituent element from another constituent element.

The terms "comprises" and/or "comprising" used in the specification specify particular features, regions, integers, steps, operations, elements, and/or components, but do not exclude the presence or addition of other particular features, regions integers, steps, operations, elements, components, and/or groups thereof.

Hereinafter, a specific configuration of a safety apparatus for a ladder according to the embodiment of the present disclosure will be described with reference to the drawings.

Figure 2:
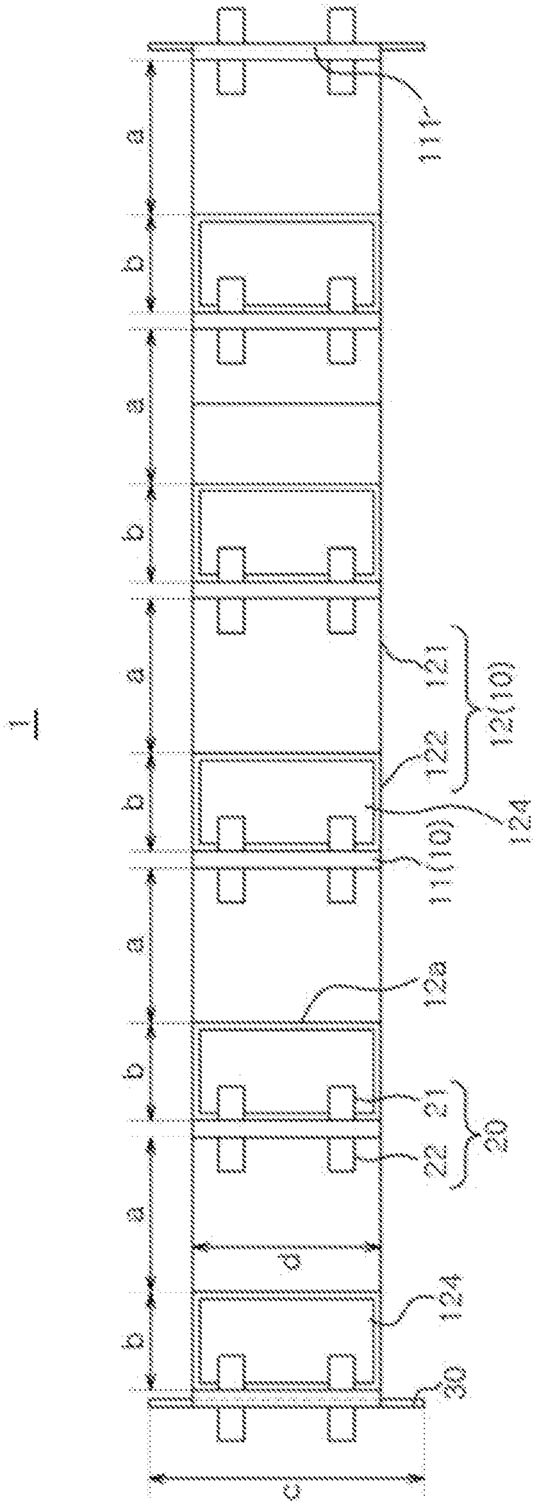
FIG. 2 is a top plan view illustrating the safety apparatus for a ladder in FIG. 1.
Figure 3:
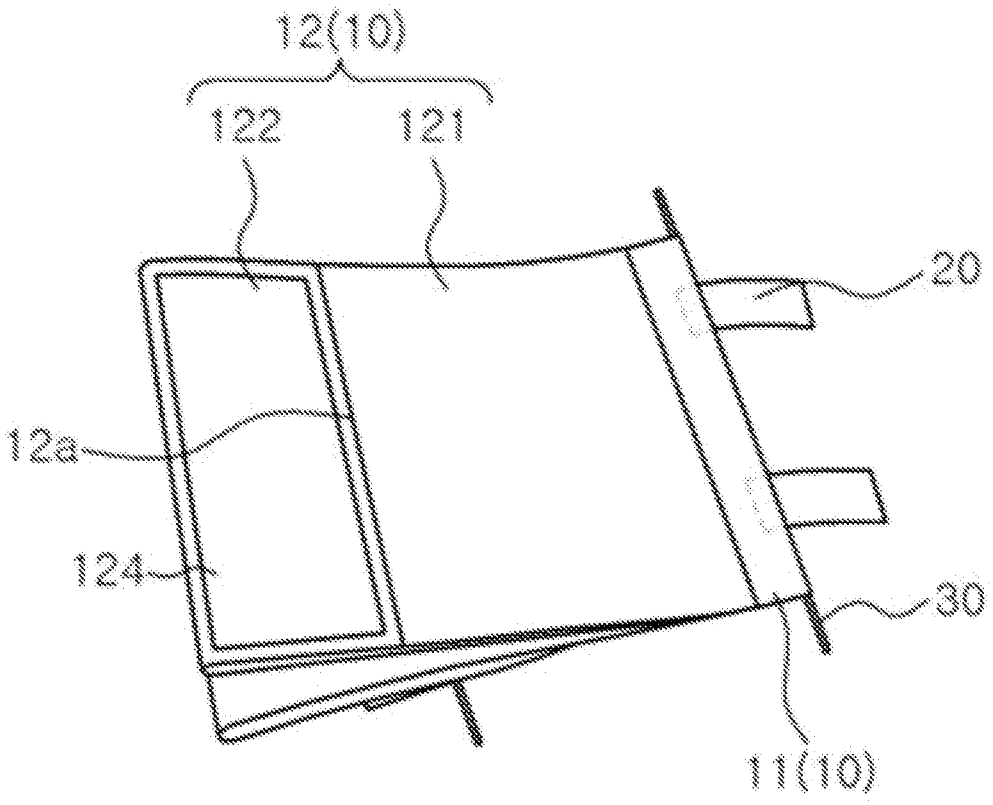
FIG. 3 is a perspective view illustrating a state in which the safety apparatus for a ladder in FIG. 1 is folded.

Referring to FIGS. 1 to 3, a safety apparatus 1 for a ladder according to an embodiment of the present disclosure refers to an apparatus for protecting safety of a user who uses a ladder 2. The safety apparatus 1 for a ladder may include a guard member 10, a plurality of fixing members 20, and a reinforcing member 30.

Meanwhile, for the convenience of description, the ladder 2 will be described briefly first. The ladder 2 may include a pair of vertical supports 2*a* having preset lengths and arranged in parallel with each other at a predetermined interval, and a plurality of horizontal supports 2*b* fixedly installed at preset intervals between the pair of vertical supports 2*a*.

The guard member 10 may be mounted on the ladder 2. At least a part of the guard member 10 may protrude toward a rear side of the ladder 2 and cover a rear surface of the ladder 2. In this case, at least a part of the guard member 10 may protrude toward the rear side of the ladder 2 by an external force applied by the user in a state in which the guard member 10 is mounted on the ladder 2 to cover a front surface of the ladder 2. In this case, the front surface of the ladder 2 means a −y-axis direction in FIG. 1, and the rear surface of the ladder 2 means a +y-axis direction in FIG. 1.

The guard member 10 may extend in one direction. For example, the guard member 10 may be made of a fiber material that may achieve an effect of preventing a slip. In this case, one direction means a ±z-axis direction in FIG. 1.

Meanwhile, the guard member 10 may include a connection part 11 connected to the fixing members 20, and a cover part 12 provided on at least one end of the connection part 11 and extending in the other direction perpendicular to one direction. In this case, the other direction means a ±x-axis direction in FIG. 1.

In this case, the connection part 11 and the cover part 12 may be integrated. In addition, the connection part 11 may be provided as a plurality of connection parts 11, the cover part 12 may be provided as a plurality of cover parts 12, and the plurality of connection parts 11 and the plurality of cover parts 12 may be alternately disposed.

The connection part 11 is a portion connected to the fixing member 20. The connection part 11 may be disposed between the two cover parts 12 disposed adjacent to the connection part 11 in one direction. The cover part 12 may be provided on at least one of one side and the other side of the connection part 11.

The cover part 12 may be selectively unfolded and serve as not only a cover for covering a rear surface of the ladder 2 but also a foothold on which the user may step. To this end, the cover part 12 may be provided on at least one end of the connection part 11.

Meanwhile, the cover part 12 may include a folding line 12*a*. The cover part 12 may be selectively unfolded with respect to the folding line 12*a*. For example, the cover part 12 may be unfolded with respect to the folding line 12*a* and used. When the cover part 12 need not be used, the cover part 12 may be folded again with respect to the folding line 12*a* and stored. When the cover part 12 is unfolded with respect to the folding line 12*a*, the cover part 12 may cover the rear surface of the ladder 2 by protruding toward the rear side of the ladder 2 through an opening defined between the two horizontal supports 2*b* disposed adjacent to each other in an extension direction (±z-axis direction in FIG. 1) of the vertical support 2*a* of the ladder 2.

Meanwhile, the cover part 12 may include a first cover body 121 disposed at any one of one side and the other side of the folding line 12*a*, and a second cover body 122 disposed at the other of one side and the other side of the folding line 12*a* and having a length different from a length of the first cover body 121.

In this case, a length a of the first cover body 121 may be longer than a length b of the second cover body 122. Therefore, one side and the other side of the cover part 12 may have an asymmetric shape with respect to the folding line 12*a*. In other words, the first cover body 121 and the second cover body 122 may be connected while defining a predetermined angle when viewed from the lateral side. The first cover body 121 and the second cover body 122 may be separated based on the folding line 12*a*.

Figure 8:
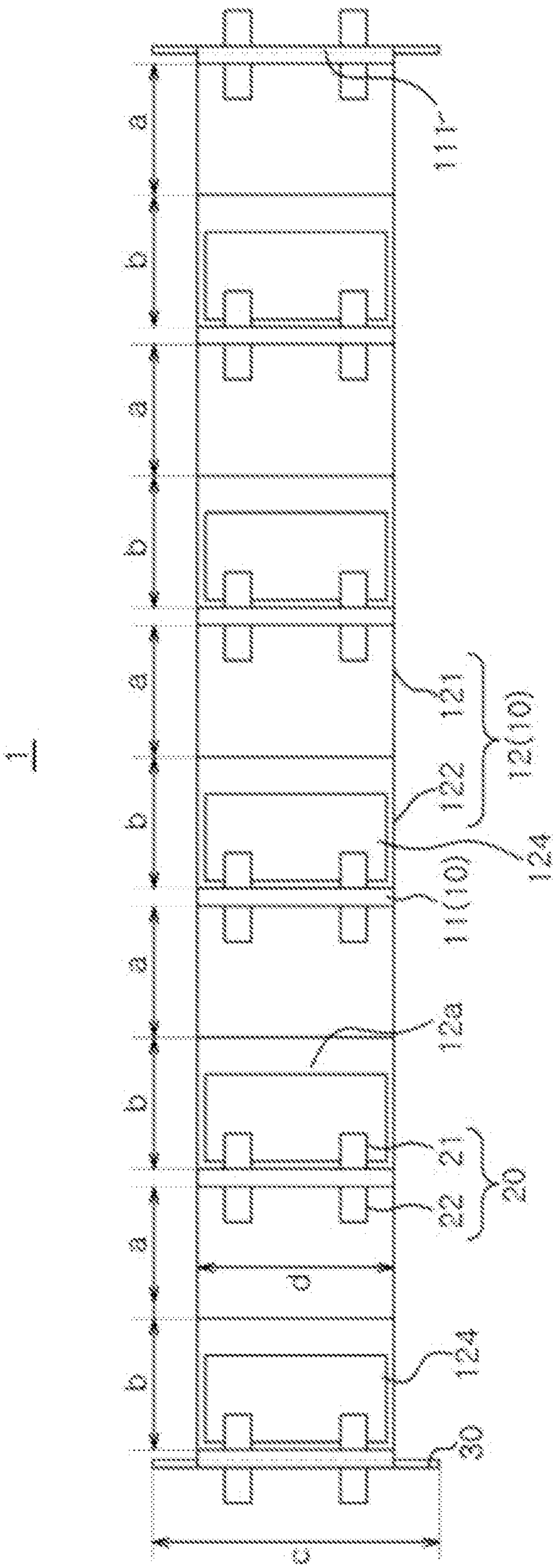
FIG. 8 is a top plan view illustrating a safety apparatus for a ladder according to yet another embodiment of the present disclosure.

However, the length a of the first cover body 121 and the length b of the second cover body 122 may be equal to each other. In other words, referring to FIG. 8, the folding line 12*a* may be formed at a center of the cover part 12. Therefore, one side and the other side of the cover part 12 may have a symmetric shape with respect to the folding line 12*a*.

Meanwhile, the first cover body 121 and the second cover body 122 may be integrated. When the cover part 12 is unfolded with respect to the folding line 12*a*, any one of the first and second cover bodies 121 and 122, for example, the second cover body 122 may be disposed in a direction deviating from a width direction of the horizontal support 2*b* of the ladder 2. On the contrary, when the cover part 12 is unfolded with respect to the folding line 12*a*, the other of the first and second cover bodies 121 and 122, for example, the first cover body 121 may be disposed substantially in parallel with the width direction e of the horizontal support 2*b* of the ladder 2. In this case, because the length b of the second cover body 122 is longer than the width e (see FIG. 4) of the horizontal support 2*b* of the ladder 2, the area in which the user may step on may increase in comparison with the related art.

The folding line 12*a* may be eliminated in case that the cover part 12 is made of a flexible material. For example, the folding line 12*a* may be eliminated in case that the cover part is made of cotton, nylon, or synthetic fiber.

In the safety apparatus 1 for a ladder according to the embodiment of the present disclosure, the cover part 12 may include a rigidity reinforcing panel 124. The rigidity reinforcing panel 124 may be disposed on at least a part of the cover part 12 and protrude toward the rear side of the ladder 2.

The rigidity reinforcing panel 124 may mean a structure having predetermined rigidity and be made of, for example, resin, metal, or wood. Further, the rigidity reinforcing panel 124 may have a flat plate shape. Furthermore, the rigidity reinforcing panel 124 may be provided as a plurality of rigidity reinforcing panels 124 on the cover part 12.

The rigidity reinforcing panel 124 may be provided on the cover part 12 and serve as a support when the cover part 12 is unfolded toward the rear side of the ladder 2. In other words, the rigidity reinforcing panel 124 may serve as a stand for the user.

The rigidity reinforcing panel 124 may be disposed on at least a part of the cover part 12. For example, the rigidity reinforcing panel 124 may be attached to one surface or the other surface of the cover part 12. Furthermore, the rigidity reinforcing panel 124 may be sealed inside the cover part 12.

The rigidity reinforcing panel 124 may be disposed at a lower side of the cover part 12. In other words, the cover part 12 may have the folding line 12*a* extending in the other direction perpendicular to one direction, and the rigidity reinforcing panel 124 may be disposed at the lower side of the cover part 12 defined by the folding line 12*a*. For example, the rigidity reinforcing panel 124 may be provided on the second cover body 122.

The plurality of fixing members 20 may serve to fix the guard member 10 to the ladder 2. To this end, the plurality of fixing members 20 may be connected to the guard member 10 and may be disposed to be spaced apart from one another in a longitudinal direction of the guard member 10.

In another embodiment, the fixing members 20 may be disposed in the width direction of the guard member 10. In other words, the plurality of fixing members 20 may be disposed to be spaced apart from one another in the width direction of the guard member 10. In this case, the fixing members 20 may be disposed in the longitudinal direction of the guard member 10. That is, a plurality of groups including the plurality of fixing members 20 disposed in the width direction may be provided in the longitudinal direction of the guard member 10.

Meanwhile, the plurality of fixing members 20 need not be necessarily provided, and the single fixing member may be provided.

The fixing member 20 may include: a first fixing body 21 provided on one surface of the connection part 11 and configured to surround at least a part of a peripheral surface of the horizontal support 2*b* of the ladder 2; and a second fixing body 22 provided on one surface of the connection part 11 and configured to surround the remaining part of the peripheral surface of the horizontal support 2*b* of the ladder 2 and selectively engage with the first fixing body 21. In this case, the first fixing body 21 may have a length larger than a thickness of the horizontal support 2*b*, and the second fixing body 22 may have a length substantially equal to or shorter than a length of the first fixing body 21. Therefore, the first fixing body 21 and the second fixing body 22 may engage with each other while at least partially overlapping each other.

The first fixing body 21 and the second fixing body 22 may be sewed to one surface of the connection part 11. However, this is just an example, and the spirit of the present disclosure is not limited thereto. The first fixing body 21 and the second fixing body 22 may be bonded to one surface of the connection part 11 by a bonding agent, or the first fixing body 21 and the second fixing body 22 may be coupled to one surface of the connection part 11 by thermal bonding or ultrasonic welding. For example, the first fixing body 21 may be a female Velcro tape having a strap shape, and the second fixing body 22 may be a male Velcro tape having a strap shape. However, this is just an example, and the spirit of the present disclosure is not limited thereto. The first fixing body 21 may be a female snap button, and the second fixing body 22 may be a male snap button.

Figure 9:
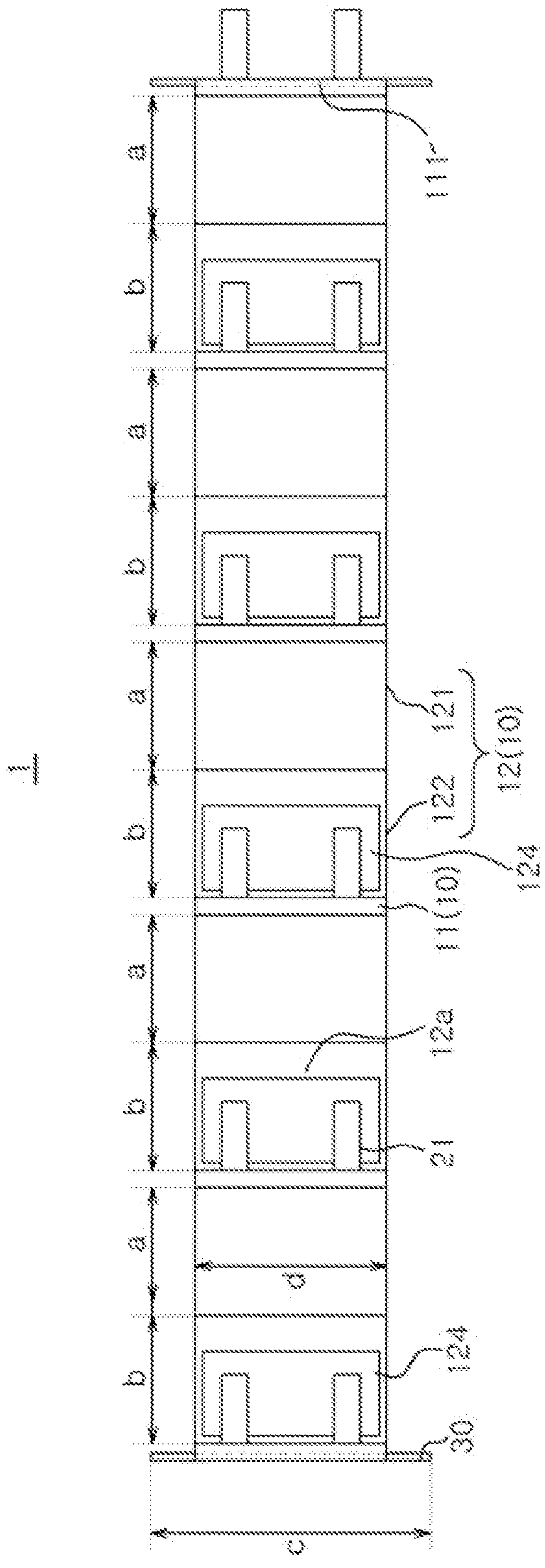
FIG. 9 is a top plan view illustrating a safety apparatus for a ladder according to still yet another embodiment of the present disclosure.

Meanwhile, only one of the first and second fixing bodies 21 and 22 may be provided (see FIG. 9). For example, one end of the first fixing body 21 may be connected to the connection part 11, the first fixing body 21 may surround the horizontal support 2*b* of the ladder, and then the other end of the first fixing body 21 may selectively engage with the connection part 11. In this case, the other end of the first fixing body 21 and the connection part 11 may be connected to each other by means of a Velcro tape, a buckle, a button, a zipper, or the like.

Meanwhile, the fixing member 20 may have a hook shape. In other words, the fixing member 20 may have a hook shape, and the fixing member 20 may be connected to and caught by an upper surface of the horizontal support 2*b* of the ladder 2. For example, the first fixing body 21 may be provided in the form of a hook having rigidity, and the second fixing body 22 may be coupled to an outer surface of the first fixing body 21. To this end, a Velcro tape, a snap button, or the like may be provided on the outer surface of the first fixing body 21.

Further, the second fixing body 22 may be eliminated in case that the first fixing body 21 has a hook shape.

The reinforcing member 30 may prevent the guard member 10 from being separated from the ladder 2 by the user's load when the user's load is applied to the guard member 10 mounted on the ladder 2. To this end, the reinforcing member 30 may be provided on at least one end of the guard member 10. In addition, the reinforcing member 30 may have a length c larger than a width d of the guard member 10, such that at least one end of the reinforcing member 30 may come into contact with the rear surface of the ladder 2, e.g., the rear surface of the vertical support 2*a*. For example, the reinforcing member 30 may be provided in the form of a rod having predetermined rigidity.

The reinforcing member 30 may be inserted into a reinforcing member insertion hole 111 provided in the connection part 11. In this case, the reinforcing member insertion hole 111 may be formed as one end of the connection part 11, which is in a state of being bent in one direction, is connected again to one surface of the connection part 11.

In this case, an outer surface of the reinforcing member 30 may be in close contact with an inner surface of the reinforcing member insertion hole 111. As necessary, a bonding agent or any coupling means may be interposed between the outer surface of the reinforcing member 30 and the inner surface of the reinforcing member insertion hole 111, such that the reinforcing member 30 may be further fixed to the guard member 10.

Figure 7:
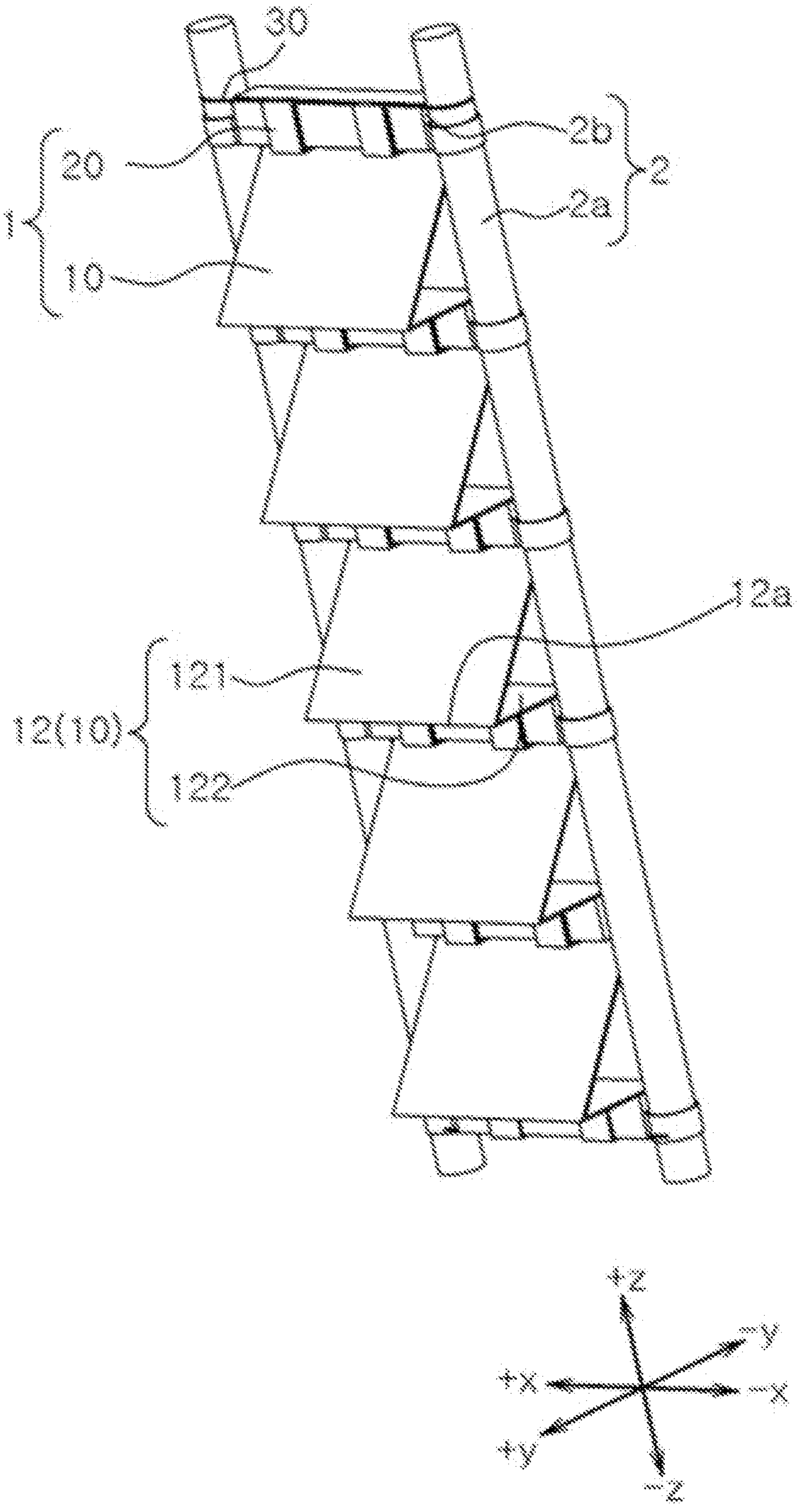
FIG. 7 is a perspective view illustrating a state in which a safety apparatus for a ladder according to still another embodiment of the present disclosure is mounted on a ladder.

In addition, referring to FIG. 7, the reinforcing member 30 may be provided in the form of a hook. In other words, two opposite ends of the reinforcing member 30 may be bent to correspond to an outer surface of the vertical support 2*a* of the ladder. Therefore, when the reinforcing member 30 is connected to the ladder 2, the two opposite ends of the reinforcing member 30 may come into contact with and surround the rear surface of the ladder 2, e.g., at least a part of the rear surface of the vertical support 2*a*.

However, the reinforcing member 30 may be eliminated, as structural or design necessary. In other words, because the safety apparatus 1 for a ladder may be stably fixed to the ladder by means of the fixing member 20, the reinforcing member 30 is an optional constituent element.

Hereinafter, an operation and effect of the safety apparatus 1 for a ladder configured as described above will be described with reference to FIGS. 4 and 5.

Figure 4:
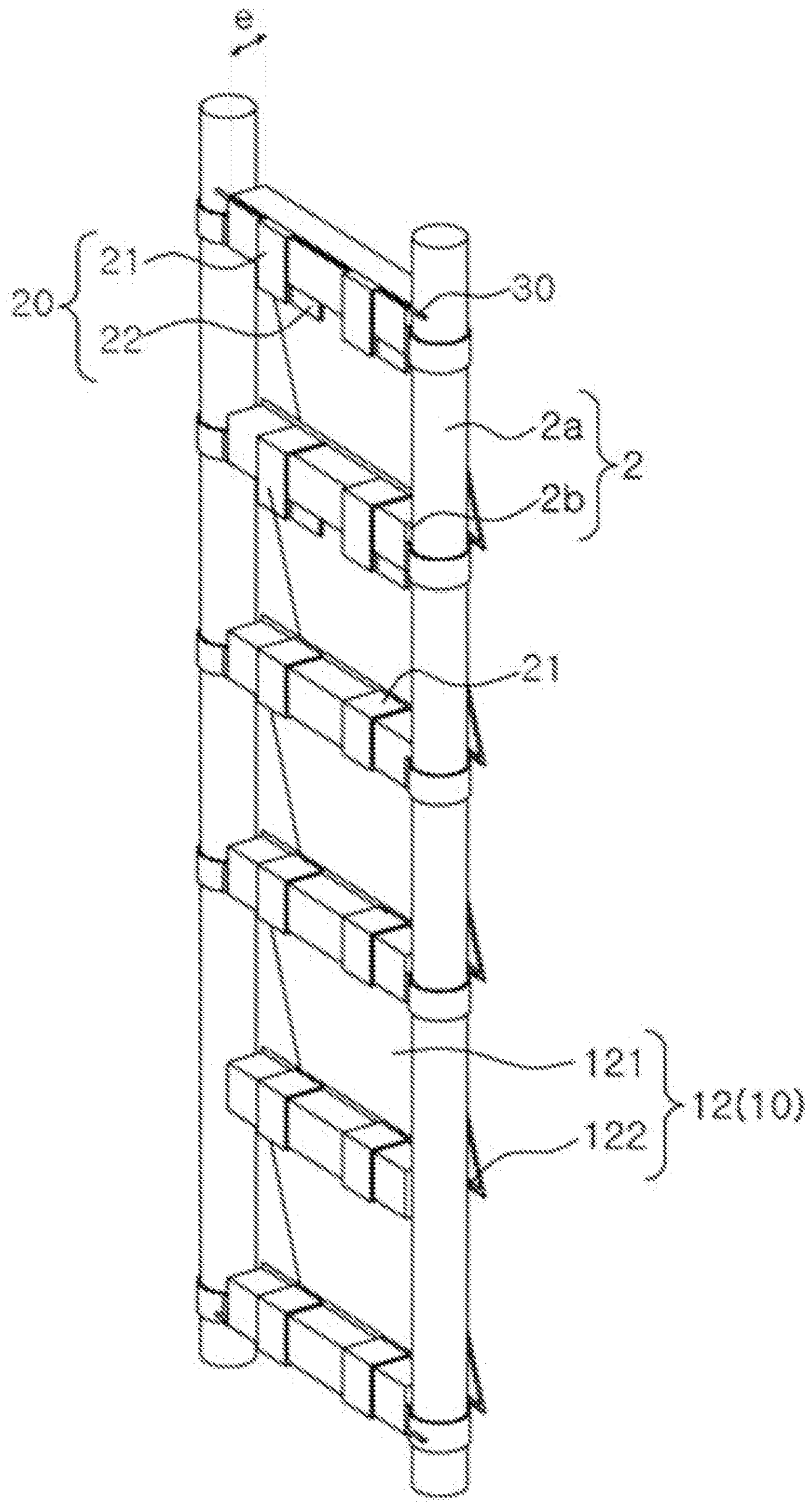
FIGS. 4 and 5 are views for explaining a process of mounting the safety apparatus for a ladder in FIG. 1 on the ladder.
Figure 5:
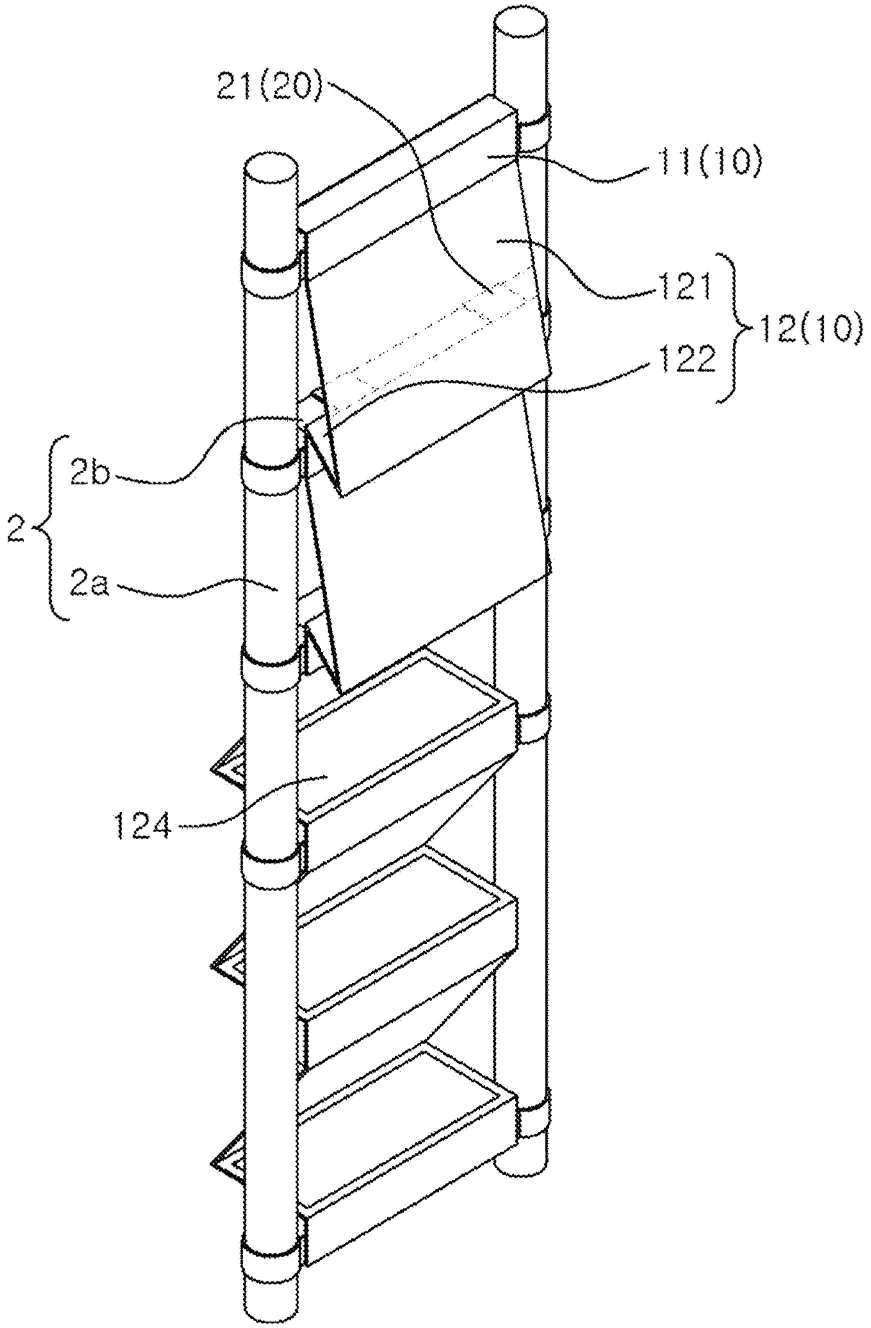

First, referring to FIGS. 4 and 5, the user may unfold the guard member 10 with respect to the folding line 12*a* by pulling at least one end of the guard member 10, which is folded with respect to the folding line 12*a*, in one direction.

Next, the user arranges the first fixing body 21 at one side of the horizontal support 2*b* so that the first fixing body 21 surrounds at least a part of the horizontal support 2*b* of the ladder 2. Next, the user arranges the second fixing body 22 at the other side of the horizontal support 2*b* so that the second fixing body 22 surrounds the remaining part of the horizontal support 2*b* of the ladder 2. In this state, the first fixing body 21 and the second fixing body 22 are connected to each other, such that the guard member 10 is mounted on the ladder 2. In this case, the cover part 12 of the guard member 10, i.e., the first cover body 121 and the second cover body 122 may have an asymmetric shape with respect to the folding line 12*a* when viewed from the lateral side and have a shape protruding toward a front side of the ladder 2.

Next, the user presses at least one of the first and second cover bodies 121 and 122, which are disposed at the front side of the ladder 2, toward the rear side of the ladder 2. Therefore, the first and second cover bodies 121 and 122 disposed at the front side of the ladder 2 protrudes through the vacant space defined between the two horizontal supports 2*b*, which are adjacent to each other in the longitudinal direction of the ladder 2, such that the first and second cover bodies 121 and 122 may be disposed at the rear side of the ladder 2. Further, the first and second cover bodies 121 and 122 protruding toward the rear side of the ladder 2 may cover the rear surface of the ladder 2. For example, any one of the first and second cover bodies 121 and 122, e.g., the second cover body 122 may be disposed in a direction deviating from the horizontal support 2*b* of the ladder 2, and the other of the first and second cover bodies 121 and 122, e.g., the first cover body 121 may be disposed in a direction substantially parallel to the horizontal support 2*b* of the ladder 2.

Therefore, the first and second cover bodies 121 and 122 disposed at the rear side of the ladder 2 may prevent the user's foot from falling out of the rear side of the ladder 2 while the user climbs up or down the ladder 2.

In addition, the user may use the second cover body 122 as a foothold by stepping on the second cover body 122 having the length b larger than a width e of the horizontal support 2*b* of the ladder 2 in the related art, which makes it possible to prevent the user from slipping off the ladder 2.

The safety apparatus 1 for a ladder may be easily mounted on all the commercially available ladders and compactly folded so that a volume thereof is minimized, such that the safety apparatus 1 may be easily stored.

In addition, a baby and child may safely climb up or down the ladder without the aid of a protector, which makes it possible to prevent the user's safety accident that may occur when the user uses the ladder.

Hereinafter, a safety apparatus 1' for a ladder according to another embodiment of the present disclosure will be described with reference to FIG. 6.

Figure 6:
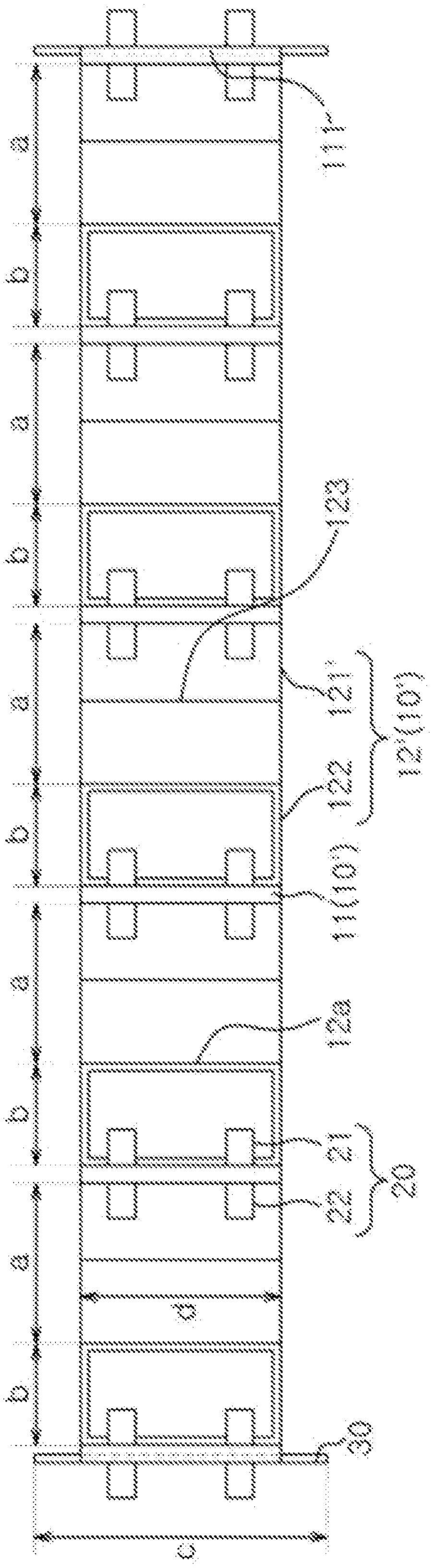
FIG. 6 is a top plan view illustrating a safety apparatus for a ladder according to another embodiment of the present disclosure.

Referring to FIG. 6, the safety apparatus 1' for a ladder according to another embodiment of the present disclosure may include a guard member 10', a plurality of fixing members 20, and a reinforcing member 30. The safety apparatus 1' for a ladder illustrated in FIG. 6 is substantially identical to the safety apparatus 1 for a ladder described with reference to FIGS. 1 to 3, except for the guard member 10'. Therefore, the description will be focused on the guard member 10' that is the difference, and the above-mentioned description of the embodiment and the reference numerals will be applied to the same constituent elements.

The guard member 10' may include a connection part 11, and a cover part 12' integrated with the connection part 11. In addition, the connection part 11 may be provided as a plurality of connection parts 11, the cover part 12' may be provided as a plurality of cover parts 12', and the plurality of connection parts 11 and the plurality of cover parts 12' may be alternately disposed. However, because the connection part 11 has been described with reference to FIGS. 1 to 3, a repeated description thereof will be omitted.

The cover part 12' may include a first cover body 121' disposed at any one of one side and the other side of the folding line 12*a*, and a second cover body 122 disposed at the other of one side and the other side of the folding line 12*a* and having a length different from a length of the first cover body 121'.

Meanwhile, any one of the first and second cover bodies 121' and 122 may have a division line 123. The division line 123 is provided on the first cover body 121' or the second cover body 122 and extends in the other direction or in a direction parallel to the folding line 12*a*. The first cover body 121' or the second cover body 122 may be divided into two portions. In the present embodiment, the example has been described in which the division line 123 is provided on the first cover body 121'. However, the spirit of the present disclosure is not limited thereto. The division line 123 may be provided on the second cover body 122.

The first cover body 121' may be folded or unfolded with respect to the division line 123. To this end, the division line 123 may be formed as a sewed line sewed to an intermediate point based on one direction, e.g., the longitudinal direction of the first cover body 121'. Therefore, the first cover body 121' may be divided into the two portions based on the division line 123, and the two portions may have a symmetric shape with respect to the division line 123.

Meanwhile, at least one of the first and second cover bodies 121' and 122 needs to be pressed toward the rear side of the ladder 2 so that the first and second cover bodies 121' and 122, which are disposed at the front side of the ladder 2, toward the rear side of the ladder 2 in the state in which the guard member 10' is mounted on the ladder 2 (see FIG. 1). In this case, because the folding line 12*a* and the division line 123 are sewed to the cover part 12', the folding line 12*a* and the division line 123 may be more easily deformed by an external force than the portion, except for the folding line 12*a* and the division line 123, i.e., the first and second cover bodies 121' and 122 when the user presses at least one of the first and second cover bodies 121' and 122 toward the rear side of the ladder 2. Therefore, because the first and second cover bodies 121' and 122 may protrude toward the rear side of the ladder 2, the guard member 10' may be more easily installed on the ladder 2.

In addition, when the safety apparatus 1' for a ladder is not used, the guard member 10' may be folded with respect to the folding line 12*a* and the division line 123 and then stored. Therefore, the volume of the safety apparatus 1' for a ladder may be further reduced, which makes it possible to easily accommodate the safety apparatus 1' for a ladder even in a small space.

While the embodiments of the present disclosure have been described above as specific embodiments, the embodiments of the present disclosure are for illustrative purposes only, and the present disclosure is not limited thereto. The present disclosure should be interpreted as having the widest scope defined by the basic spirit disclosed in the present specification. Those skilled in the art may combine/substitute the disclosed embodiments to perform patterns with unspecified shapes, but this does not depart from the scope of the present disclosure. In addition, it is apparent that those skilled in the art may easily change or modify the embodiment disclosed based on the present specification, and such changes or modifications also belong to the protection scope of the present disclosure.

What is claimed is:

1. A safety apparatus for a ladder, which protects safety of a user who uses a ladder, the safety apparatus comprising:
a guard member provided to be mounted on the ladder and extending in one direction (+z-axis direction); and
at least one fixing member provided on the guard member and configured to fix the guard member to the ladder;
wherein the guard member has at least a part configured to protrude toward a rear side of the ladder and to cover a rear surface of the ladder;
wherein the guard member comprises a connection part connected to the fixing member, and a cover part provided on at least one end of the connection part, the cover part having a rigidity reinforcing panel;
wherein the rigidity reinforcing panel is disposed on at least a part of the cover part and is configured to protrude toward the rear side of the ladder;
wherein the fixing member comprises a first fixing body provided on one surface of the connection part, the first fixing body being configured to surround at least a part of a peripheral surface of a horizontal support of the ladder; and
wherein the fixing member comprises a second fixing body provided on one surface of the connection part, the second fixing body being configured to surround a remaining part of the peripheral surface of the horizontal support of the ladder and to selectively engage with the first fixing body.

2. The safety apparatus of claim 1, wherein the fixing member is provided as a plurality of fixing members, and the plurality of fixing members is disposed in a width direction (+x-axis direction) of the guard member.

3. The safety apparatus of claim 1, wherein the cover part has a folding line extending in an other direction (+x-axis direction) perpendicular to the one direction (+z-axis direction), and the rigidity reinforcing panel is disposed at a lower side of the cover part defined by the folding line.

4. The safety apparatus of claim 3, wherein the cover part is configured to be selectively unfolded with respect to the folding line.

5. The safety apparatus of claim 3, wherein the cover part comprises:
a first cover body disposed at any one of one side and the other side of the folding line; and
a second cover body disposed at the other of one side and the other side of the folding line and having a length equal to a length of the first cover body.

6. The safety apparatus of claim 5, wherein the first cover body and the second cover body have the same shape.

7. The safety apparatus of claim 1, wherein the connection part is provided as a plurality of connection parts, the cover part is provided as a plurality of cover parts, and the plurality of the connection parts and the plurality of the cover parts are alternately disposed.

8. The safety apparatus of claim 1, wherein the connection part and the cover part are integrated.

9. The safety apparatus of claim 1, wherein the fixing member is provided on one surface of the connection part and surrounds at least a part of a peripheral surface of a horizontal support of the ladder.

10. The safety apparatus of claim 1, wherein the fixing member has a hook shape.

11. The safety apparatus of claim 1, further comprising:
an auxiliary fixing body provided on one surface of the connection part, spaced apart from the fixing member, and configured to surround a horizontal support of the ladder.

12. The safety apparatus of claim 1, further comprising:
a reinforcing member provided on at least one end of the guard member and having a hook shape so as to be caught by the ladder.

13. A safety apparatus for a ladder, which protects safety of a user who uses a ladder, the safety apparatus comprising:
a guard member provided to be mounted on the ladder and extending in one direction (+z-axis direction); and
at least one fixing member provided on the guard member and configured to fix the guard member to the ladder;

wherein the guard member has at least a part configured to protrude toward a rear side of the ladder and to cover a rear surface of the ladder;

wherein the guard member comprises a connection part connected to the fixing member, and a cover part provided on at least one end of the connection part, the cover part having a rigidity reinforcing panel;

wherein the rigidity reinforcing panel is disposed on at least a part of the cover part and is configured to protrude toward the rear side of the ladder;

wherein the cover part has a folding line extending in an other direction (+x-axis direction) perpendicular to the one direction (+z-axis direction), and the rigidity reinforcing panel is disposed at a lower side of the cover part defined by the folding line; and wherein the cover part comprises a first cover body disposed at any one of one side and the other side of the folding line, and a second cover body disposed at the other of one side and the other side of the folding line and having a length equal to a length of the first cover body.

14. The safety apparatus of claim 13, wherein the first cover body and the second cover body have the same shape.

* * * * *